United States Patent [19]
Buchman

[11] 3,979,696
[45] Sept. 7, 1976

[54] LASER PUMPING CAVITY WITH POLYCRYSTALLINE POWDER COATING

[75] Inventor: William W. Buchman, Los Angeles, Calif.

[73] Assignee: Hughes Aircraft Company, Culver City, Calif.

[22] Filed: June 30, 1975

[21] Appl. No.: 591,263

[52] U.S. Cl. ............................ 331/94.5 P; 330/4.3; 331/94.5 D
[51] Int. Cl.² ........................................ H01S 3/091
[58] Field of Search..................... 330/4.3; 331/94.5

[56] References Cited
UNITED STATES PATENTS

| | | | |
|---|---|---|---|
| 3,445,785 | 5/1969 | Koester et al. ................. | 331/94.5 D |
| 3,634,779 | 1/1972 | Crow .............................. | 331/94.5 P |
| 3,702,976 | 11/1972 | Young ............................ | 331/94.5 E |

*Primary Examiner*—William L. Sikes
*Attorney, Agent, or Firm*—Paul M. Coble; W. H. MacAllister

[57] ABSTRACT

A coating consisting of polycrystalline $Sm_2O_3$ powder dispersed in a $Na_2SiO_3$ or $K_2SiO_3$ binder may be provided on either the inner or outer lateral surface of a substantially tubular pumping cavity housing member for a Nd:YAG laser. The coating is absorptive of radiation at the lasing wavelength of about 1.06 μm and has a thickness sufficient to provide a high diffuse reflectivity for pumping radiation.

14 Claims, 4 Drawing Figures

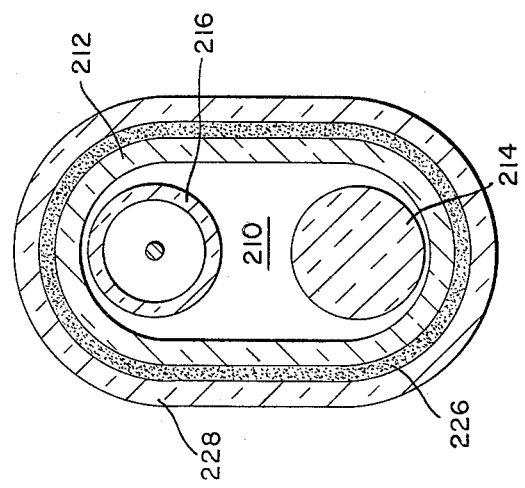
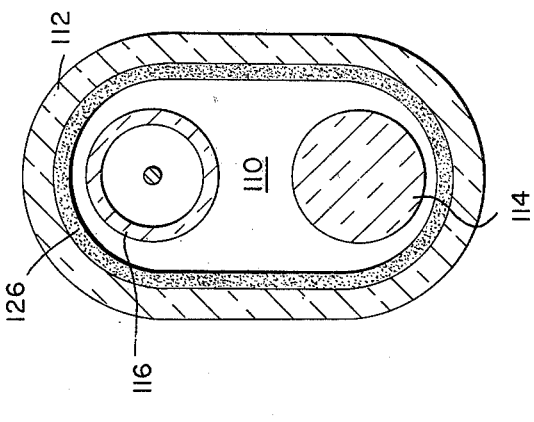
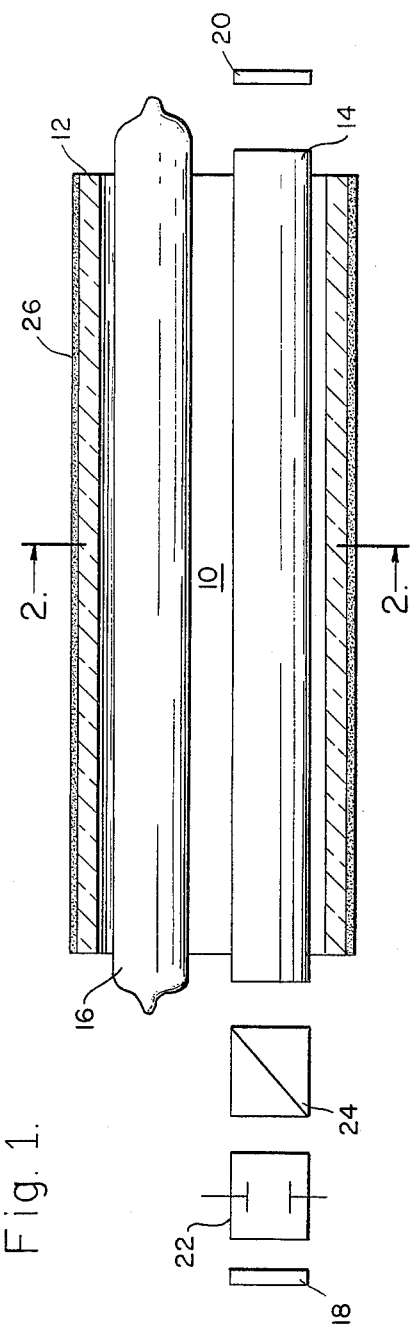
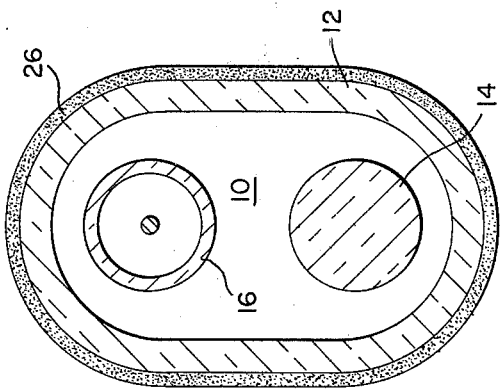

LASER PUMPING CAVITY WITH POLYCRYSTALLINE POWDER COATING

This invention relates to lasers, and more particulary relates to a laser pumping cavity for both diffusely reflecting radiation in the pumping wavelengths and absorbing radiation at the lasing wavelength.

When certain high gain laser materials such as Nd:YAG are pumped to a condition of large population inversion, for example in order to achieve Q-switching, a saturation effect occurs which limits the laser output energy obtainable regardless of the level of input pumping energy. This saturation is caused in part by a laser depumping phenomenon resulting from the fact that a significant amount of fluorescent radiation at the lasing wavelength escapes laterally from the laser rod into the surrounding pumping cavity and is reflected by the pumping cavity back into the laser rod. This return radiation stimulates decay from the upper laser transition level, thereby effectively limiting the number of excited ions which can occupy that level and, in turn, limiting the maximum output energy obtainable from the laser.

In order to reduce depumping due to return radiation at the lasing wavelength, laser pumping cavities have been constructed wherein both the laser rod and the pumping flashlamp are mounted within a member of a material transparent to the pumping radiation and absorptive of radiation at the lasing wavelength. In the case of Nd:YAG which has a lasing wavelength of about 1.06 $\mu$m, samarium-doped glass has been successfully employed as the pumping cavity member.

In addition, in order to achieve uniform illumination of the surface of the laser rod by the pumping radiation, it has been found desirable to surround the laser pumping cavity with a surface having a high diffuse reflectivity. For this purpose, in the aforementioned pumping cavity for Nd:YAG lasers a layer of tightly packed barium sulfate powder has been provided between the outer surface of the samarium glass member and an outer glass tube. Although the aforedescribed laser pumping cavity facilitates the generation of high energy, uniform intensity output beams from Nd:YAG lasers, the samarium glass cavity members are relatively fragile, expensive, and difficult to fabricate.

Accordingly, it is an object of the present invention to provide a simple and inexpensive laser pumping cavity which provides a diffuse reflective surface for pumping radiation and at the same time absorbs radiation at the lasing wavelength to minimize depumping of the laser material.

It is a further object of the invention to provide a laser pumping cavity, especially suitable for a Q-switched Nd:YAG laser, which is simple in design, inexpensive to fabricate, and reliable and durable in operation.

A laser pumping cavity according to the invention includes a housing member laterally surrounding a rod of laser material and a light source which emits pumping radiation for exciting the laser material to a lasing condition. A coating is provided on either the inner or outer lateral surface of the housing member. The coating includes a polycrystalline powder absorptive of radiation at the lasing wavelength and having a thickness sufficient to provide a high diffuse reflectivity for the pumping radiation. In a preferred embodiment of the invention the laser material is Nd:YAG and the polycrystalline powder is $Sm_2O_3$.

Additional objects, advantages and characteristic features of the present invention will become readily apparent from the following detailed description of preferred embodiments of the invention when considered in conjunction with the accompanying drawing wherein:

FIG. 1 is a longitudinal sectional view, partly in schematic form, illustrating a laser arrangement including a pumping cavity according to one embodiment of the invention;

FIG. 2 is a cross-sectional view taken along line 2—2 of FIG. 1;

FIG. 3 is a cross-sectional view similar to FIG. 2 illustrating a laser pumping cavity according to another embodiment of the invention; and FIG. 4 is a cross-sectional view similar to FIG. 2 showing a laser pumping cavity according to a further embodiment of the invention.

Referring to FIGS. 1 and 2 with greater particularity, there is shown an elongated laser pumping cavity 10 including a substantially tubular housing member 12 of a transparent material such as fused quartz or borosilicate glass. The pumping cavity 10 preferably has the configuration of an elliptic cylinder or a near elliptic cylinder, although other configurations are also suitable and may be employed. A rod 14 of laser material such as Nd:YAG is disposed within the pumping cavity 10, and a pumping flashlamp 16 is disposed within the cavity 10 parallel to and substantially coextensive with the laser rod 14. The rod 14 and the flashlamp 16 may be mounted on metal tabs (not shown) external to the cavity 10, leaving openings at the ends of the cavity 10 surrounding the rod 14 and the flashlamp 16 so as to permit a high pressure gaseous coolant, such as pressurized nitrogen, to be circulated past the rod 14 and the flashlamp 16.

The flashlamp 16 emits pumping radiation which excites the material of the rod 14 to a condition in which population inversion is established between a pair of energy levels of the laser material. As a result, laser radiation is emitted from the ends of the rod 14 at a wavelength corresponding to the energy difference between the pair of energy levels in question. As an example, when the laser rod 14 is of Nd:YAG, the desired pumping radiation may be provided by a xenon flashlamp 16, creating laser emission at wavelengths around 1.06 $\mu$m due to laser transitions between the $^4F_{3/2}$ and $^4F_{11/2}$ energy states of neodymium.

A pair of aligned reflectors 18 and 20 may be disposed adjacent opposite ends of laser rod 14 to provide an optical resonator for reflecting emitted laser radiation back into the rod 14 in regenerative fashion. Q-switching operation may be achieved by locating conventional Q-switching elements between an end of the rod 14 and one of the reflectors such as 18. The Q-switching elements may include an electrooptic device 22 (such as a Kerr cell or a Pockels cell) and a polarizer 24 (such as Nicol polarizer or a Glan-Thomson prism), for example.

In order to provide a diffuse reflector for reflecting pumping radiation from the flashlamp 16 as well as for absorbing radiation at the lasing wavelength, a coating 26 consisting of a polycrystalline powder dispersed in a suitable binder is disposed on the outer lateral surface of the housing member 12. When the laser material is Nd:YAG, the polycrystalline powder preferably is samarium oxide ($Sm_2O_3$), and the binder may be sodium silicate ($Na_2SiO_3$) or potassium silicate ($K_2SiO_3$). The coating 26 also should be sufficiently thick to reflect substantially all of the incident pumping radiation from the flashlamp 16. Exemplary thicknesses for the coating 26 are from about 5 to about 20 mils, and preferably about 15 mils. The coating 26 may be applied to the surface of housing member 12 by painting or spraying.

An example of a specific fabrication technique for the coating 26 is as follows. The coating material may be formed by first dissolving one part by weight of sodium silicate ($Na_2SiO_3$) in two parts by weight of water. Ten parts by weight of samarium oxide ($Sm_2O_3$) powder are then added, and the mixture is stirred thoroughly. Additional water may be added, if necessary, to produce a suspension with about the consistency of house paint. The coating material is then painted over the outer lateral surface of the housing member 12 and allowed to dry. In order to minimize any tendency for flaking of the resultant coating 26, it is preferred to apply the coating in incremental layers not exceeding about 5 mils in thickness, allowing the applied coating material to dry thoroughly before application of the next layer.

Since the coating 26 consists of polycrystalline powder particles, photons entering the coating 26 are repeatedly refracted, reflected or otherwise deviated by the various powder particle surfaces. Those photons for which the particles are transparent follow a random path through the coating 26 until they are scattered out of the coating, and the coating 26 is sufficiently thick so that there is a high probability that these photons will leave the coating on the same side from which they entered. Thus, the coating 26 serves to effectively diffusely reflect such photons. On the other hand, those photons for which the powder particles are absorptive are likely to be absorbed on their random path through the coating 26.

Since trivalent samarium ions are highly absorptive of radiation at 1.06 $\mu$m, a samarium oxide coating 26 is able to absorb laser radiation from a Nd:YAG laser rod 14, thereby minimizing depumping of the rod 14. At the same time the coating 26 itself serves as a diffuse reflector for reflecting pumping radiation from the flashlamp 16 so that the pumping radiation uniformly illuminates the surface of laser rod 14. In contrast, samarium-doped glass employed in prior art laser pumping cavities is a homogenous, amorphous mixture incapable of reflecting pumping radiation. Thus, in a laser pumping cavity according to the invention a single element is employed to perform two functions heretofore required to be performed by separate elements. Moreover, the need for samarium-doped glass is eliminated. Thus, a pumping cavity according to the present invention is simpler, easier to fabricate and less expensive than laser pumping cavities of the prior art.

A laser pumping cavity according to another embodiment of the invention is illustrated in FIG. 3. Components in the embodiment of FIG. 3 which are similar to corresponding components in the embodiment of FIGS. 1–2 are designated by the same second and third reference numeral digits as their counterpart components in FIGS. 1–2, along with the addition of prefix numeral "1." The embodiment of FIG. 3 differs from that of FIGS. 1–2 in that the crystalline powder-containing coating 126 is disposed on the inner lateral surface of pumping cavity housing member 112. An advantage of the embodiment of FIG. 3 is that housing member 112 need not be of transparent material. On the other hand, housing member 12 of the embodiment of FIGS. 1–2 is able to better protect the powder-containing coating from radiation contamination.

A further embodiment of the invention is illustrated in FIG. 4. Components in the embodiment of FIG. 4 which are similar to corresponding components in the embodiment of FIGS. 1–2 are designated by the same second and third reference numeral digits as their counterpart components in FIGS. 1–2, along with the addition of prefix numeral "2." In the embodiment of FIG. 4 a layer 226 of polycrystalline powder ($Sm_2O_3$ for a Nd:YAG laser) is packed between the outer lateral surface of housing member 212 and the inner lateral surface of a coaxial substantially tubular outer housing member 228. Each of the housing members 212 and 228 may be of glass, although the outer member 228 need not be of transparent material.

Although the present invention has been shown and described with reference to particular embodiments, nevertheless various changes and modifications which are obvious to a person skilled in the art to which the invention pertains are deemed to lie within the spirit, scope and contemplation of the invention.

What is claimed is:
1. A laser pumping arrangement comprising:
    a rod of laser material, a light source optically coupled to said rod for emitting pumping radiation to establish population inversion in said laser material between a pair of energy levels such that said rod emits laser radiation at a lasing wavelength corresponding to the energy difference between said energy levels;
    a housing member laterally surrounding said rod and said light source; and
    a coating on a lateral surface of said housing member, said coating including a polycrystalline powder absorptive of radiation at said lasing wavelength and having a thickness sufficient to provide a high diffuse reflectivity for said pumping radiation.

2. An arrangement according to claim 1 wherein said laser material is Nd:YAG and said polycrystalline powder is $Sm_2O_3$.

3. An arrangement according to claim 2 wherein said coating has a thickness of from about 5 to about 20 mils.

4. An arrangement according to claim 1 wherein said polycrystalline powder is dispersed in a binder adhering to said lateral surface of said housing member.

5. An arrangement according to claim 4 wherein said laser material is Nd:YAG, said polycrystalline powder is $Sm_2O_3$, and said binder is selected from the group consisting of $Na_2SiO_3$ and $K_2SiO_3$.

6. An arrangement according to claim 4 wherein said housing member is transparent to said pumping radiation and to radiation at said lasing wavelength, and said coating is disposed on the outer lateral surface of said housing member.

7. An arrangement according to claim 6 wherein said laser material is Nd:YAG, said polycrystalline powder is $Sm_2O_3$, said binder is selected from the group consisting of $Na_2SiO_3$ and $K_2SiO_3$.

8. An arrangement according to claim 7 wherein said coating has a thickness of from about 5 to about 20 mils.

9. An arrangement according to claim 4 wherein said housing member is of a substantially tubular configuration, and said coating is disposed on the inner lateral surface of said housing member.

10. An arrangement according to claim 9 wherein said laser material is Nd:YAG, said polycrystalline powder is $Sm_2O_3$, and said binder is selected from the group consisting of $Na_2SiO_3$ and $K_2SiO_3$.

11. An arrangement according to claim 10 wherein said coating has a thickness of from about 5 to about 20 mils.

12. A laser pumping arrangement comprising:
a rod of laser material, a light source optically coupled to said rod for emitting pumping radiation to establish population inversion in said laser material between a pair of energy levels such that said rod emits laser radiation at a lasing wavelength corresponding to the energy difference between said energy levels;
a first substantially tubular housing member transparent to said pumping radiation and to radiation at said lasing wavelength laterally surrounding said rod and said light source;
a second substantially tubular housing member coaxially disposed about and spaced slightly from said first housing member; and
a layer of polycrystalline powder packed between said first and second housing members, said powder being absorptive of radiation at said lasing wavelength and having a thickness sufficient to provide a high diffuse reflectivity for said pumping radiation.

13. An arrangement according to claim 12 wherein said laser material is Nd:YAG and said polycrystalline powder is $Sm_2O_3$.

14. An arrangement according to claim 13 wherein said layer has a thickness of from about 5 to about 20 mils.

* * * * *